United States Patent
Kiyokawa

(10) Patent No.: US 12,445,423 B2
(45) Date of Patent: Oct. 14, 2025

(54) COMMUNICATION DEVICE, VEHICLE, COMMUNICATION METHOD, AND RECORDING MEDIUM RECORDED WITH PROGRAM

(71) Applicant: TOYOTA JIDOSHA KABUSHIKI KAISHA, Toyota (JP)

(72) Inventor: Takahito Kiyokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 18/056,745

(22) Filed: Nov. 18, 2022

(65) Prior Publication Data

US 2023/0224289 A1   Jul. 13, 2023

(30) Foreign Application Priority Data

Jan. 12, 2022 (JP) .................. 2022-003365

(51) Int. Cl.
*H04L 9/40* (2022.01)
*H04L 12/40* (2006.01)

(52) U.S. Cl.
CPC .............. *H04L 63/08* (2013.01); *H04L 12/40* (2013.01); *H04L 2012/40215* (2013.01)

(58) Field of Classification Search
CPC   H04L 63/08; H04L 12/40; H04L 2012/40215
See application file for complete search history.

(56) References Cited

U.S. PATENT DOCUMENTS

| | | | |
|---|---|---|---|
| 9,705,678 B1* | 7/2017 | Wang | G06F 21/602 |
| 2016/0297401 A1* | 10/2016 | Haga | H04L 9/0891 |
| 2017/0048241 A1* | 2/2017 | Tanabe | H04L 63/123 |
| 2017/0208065 A1* | 7/2017 | Yajima | H04L 63/0876 |
| 2019/0349426 A1* | 11/2019 | Smith | H04L 41/0806 |
| 2021/0160256 A1 | 5/2021 | Banno | |
| 2021/0300432 A1* | 9/2021 | Fukuzawa | H04L 63/1425 |

FOREIGN PATENT DOCUMENTS

| | | |
|---|---|---|
| CN | 112825500 | 5/2021 |
| JP | 2021-83005 A | 5/2021 |

* cited by examiner

Primary Examiner — Vance M Little
(74) Attorney, Agent, or Firm — Oblon, McClelland, Maier & Neustadt, L.L.P.

(57) ABSTRACT

A communication device including a reception section to receive from each of other communication devices a message appended with authentication information generated by the other communication device, an authentication section to, for each of the messages received by the reception section, authenticate the message based on the authentication information appended to the message, and a determination section to, for each of the other communication devices or for each type of the message, determine an abnormal-communication state in cases in which authentication has failed less than a specific number of times from among plural authentications performed by the authentication section for a corresponding respective plural of the messages, and determine that there is not the abnormal-communication state in cases in which authentication has failed the specific number of times or greater from among the plural authentications performed by the authentication section for the corresponding respective plural messages.

8 Claims, 12 Drawing Sheets

COMMUNICATION DEVICE, VEHICLE, COMMUNICATION METHOD, AND RECORDING MEDIUM RECORDED WITH PROGRAM

CROSS-REFERENCE TO RELATED APPLICATION

This application is based on and claims priority under 35 USC 119 from Japanese Patent Application No. 2022-003365 filed on Jan. 12, 2022, the disclosure of which is incorporated by reference herein.

BACKGROUND

Technical Field

The present disclosure is related to a communication device, a vehicle, a communication method, and a program.

Related Art

Japanese Patent Application Laid-Open (JP-A) No. 2021-083005 discloses a vehicle communication device that receives first data and second data different to the first data, generates third data based on the received first data and an encryption key, and compares the second data against the third data. The vehicle communication device authenticates the first data when both data match, and determines a device abnormal state when there is no match between the second data and the third data every time in results of plural comparisons performed plural times on the received data within a specific period of time from vehicle startup, and determines a device operational state when the results of the plural comparisons include such a match.

SUMMARY

However, there is a concern that the vehicle communication device of JP-A No. 2021-083005 might not be able to take appropriate measures in cases in which authentication fails for some data received from plural communication devices. This is because there is no discrimination between authentication failing every time for data received from only some communication devices, and authentication failing for some data irrespective of the communication device.

SUMMARY

An object of the present disclosure is to provide a communication device capable of suppressing mistaken determination of an abnormal-communication state even in cases in which authentication fails for some messages received from plural communication devices, and to a vehicle, a communication method, and a program of the same.

The first aspect is a communication device including a reception section, an authentication section, and a determination section. The reception section is configured to receive from each of a plurality of other communication devices a message appended with authentication information generated by the other communication device. The authentication section is configured to, for each of the messages received by the reception section, authenticate the message based on the authentication information appended to the message. The determination section is configured to, for each of the other communication devices or for each type of message, determine that there is an abnormal-communication state in a case in which authentication has failed at least once and less than a specific number of times from among plural authentications performed by the authentication section for corresponding respective plural of the messages, and determine that there is not an abnormal-communication state in a case in which authentication has failed the specific number of times or greater from among the plural authentications performed by the authentication section for a corresponding respective plural of the messages.

In the communication device of the first aspect the reception section receives from each of the other communication devices the messages appended with authentication information generated by the other communication device. For each of the messages received by the reception section the authentication section authenticates the message based on the authentication information appended to the message. The determination section then, for each of the other communication devices or for each type of the message, determines that there is the abnormal-communication state in a case in which authentication has failed at least once and less than a specific number of times from among plural authentications performed by the authentication section for the corresponding respective plural messages, and determine that there is not an abnormal-communication state in a case in which authentication has failed the specific number of times or greater from among the plural authentications performed by the authentication section for the corresponding respective plural messages.

A case in which authentication failed at least once and less than a specific number of times from among plural authentications performed by the authentication section for a respective plural of the messages corresponding either to a single other communication device or to a single type of message are treated as an abnormality in the other communication device, enabling determination that this is not a communication abnormality such as from hacking. The communication device is thereby able to suppress mistaken determination of an abnormal-communication state even in a case in which authentication fails for some of the received data from plural communication devices.

A communication device of a second aspect is the communication device of the first aspect wherein the message includes identification information to indicating a type of message, and the determination section is configured to, for each of the identification information, determine the abnormal-communication state in a case in which authentication has failed at least once and less than a specific number of times from among plural authentications performed by the authentication section for respective plural of the messages including the identification information, and determine that there is not the abnormal-communication state in a case in which authentication has failed the specific number of times or greater from among the plural authentications performed by the authentication section for respective plural of the messages including the identification information.

In the communication device of the second aspect, cases in which authentication failed at least once and less than the specific number of times from among plural authentications performed by the authentication section for the respective plural messages including the identification information indicating the single type of message are treated as an abnormality in the other communication device, enabling determination that this is not a communication abnormality such as from hacking.

A communication device of a third aspect is a communication device of the first aspect or the second aspect, further including a discarding section configured to discard a message that has failed the authentication, and an information processing section configured to execute information processing according to the message. The information processing section thereof is configured to detect a communication disruption based on a reception condition of the message. In a case in which the communication disruption has been detected the determination section is configured to determine the abnormal-communication state in a case in which authentication has failed for a type of the message corresponding to the detected communication disruption at least once and less than a specific number of times from among plural authentications performed by the authentication section for a corresponding respective plural of the messages, and determine that there is not the abnormal-communication state in a case in which authentication has failed the specific number of times or greater from among the plural authentications performed by the authentication section for the corresponding respective plural messages.

In the communication device of the third aspect the discard section discards a message that has failed the authentication, and the information processing section detects the communication disruption based on the reception condition of the message that was discarded. Then when the communication disruption has been detected, the determination section determines that there is the abnormal-communication state in a case in which authentication has failed for a type of the message corresponding to the detected communication disruption at least once and less than a specific number of times from among plural authentications performed by the authentication section for a corresponding respective plural of the messages, and determine that there is not the abnormal-communication state in a case in which authentication has failed the specific number of times or greater from among the plural authentications performed by the authentication section for the corresponding respective plural messages.

Thus by discarding the messages that failed authentication, even in a case in which communication disruption was detected, the abnormal-communication state is not determined when authentication failed for the type of the message corresponding to the detected communication disruption the specific number of times or greater from among the plural authentications performed by the authentication section for the corresponding respective plural messages. The communication device is thereby able to suppress mistaken determination of an abnormal-communication state even in a case in which authentication-failed messages are discarded.

A communication device of a fourth aspect is the communication device any one of the first aspect to the third aspect wherein the authentication section is configured to authenticate the message based on an encryption key stored in memory and on the authentication information appended to the message, and the determination section is configured to determine an abnormal state of an encryption key of the other communication device in a case in which authentication has failed the specific number of times or greater from among the plural authentications performed by the authentication section for the corresponding respective plural messages.

In the communication device of the fourth aspect, the determination section determines that there is the abnormal state of the encryption key of the other communication device in a case in which authentication has failed the specific number of times or greater from among the plural authentications performed by the authentication section for the corresponding respective plural messages for each of the other communication devices or for each of the message types. The communication device is thereby able to determine the abnormal state of the encryption key of the other communication device.

A communication device of a fifth aspect is the communication device of any one of first aspect to the fourth aspect wherein the determination section is configured to determine the abnormal-communication state in a case in which some authentications have failed from among the plural authentications performed by the authentication section for a corresponding respective plural of the messages, and determine that there is not the abnormal-communication state in a case in which authentication has failed for all of the plural authentications performed by the authentication section for the corresponding respective plural messages.

In the communication device of the fifth aspect the determination section determines that there is the abnormal-communication state in a case in which some authentications have failed from among the plural authentications performed by the authentication section for the corresponding respective plural of the messages, and determine that there is not the abnormal-communication state in a case in which authentication has failed for all of the plural authentications performed by the authentication section for the corresponding respective plural messages.

A sixth aspect is a vehicle including plural communication devices, each being the communication device according to any one of the first aspect to the fifth aspect.

A seventh aspect is a communication method including a reception section receiving from each of other communication devices a message appended with authentication information generated by the other communication device, for each of the messages received by the reception section an authentication section authenticating the message based on the authentication information appended to the message, and, for each of the other communication devices or for each type of the message, a determination section determining an abnormal-communication state in a case in which authentication has failed at least once and less than a specific number of times from among plural authentications performed by the authentication section for a corresponding respective plural of the messages, and not determining the abnormal-communication state in a case in which authentication has failed the specific number of times or greater from among the plural authentications performed by the authentication section for the corresponding respective plural messages.

In the communication method of the seventh aspect the reception section receives from each of the other communication devices the message appended with authentication information generated by the other communication device. For each of the messages received by the reception section the authentication section authenticates the message based on the authentication information appended to the message. Then for each of the other communication devices or for each type of the message, the determination section determines that there is an abnormal-communication state in a case in which authentication has failed at least once and less than a specific number of times from among plural authentications performed by the authentication section for a corresponding respective plural of the messages, and determines that there is not the abnormal-communication state in a case in which authentication has failed the specific number of times or greater from among the plural authentications performed by the authentication section for the corresponding respective plural messages.

The communication method thereby enables mistaken determination of an abnormal-communication state even in a case in which authentication has failed for some of the data received from the plural communication devices.

An eight aspect is a non-transitory recording medium recorded with a program causing a computer to execute processing. The processing includes receiving from each of other communication devices a message appended with authentication information generated by the other communication device, for each of the received messages authenticating the message based on the authentication information appended to the message, for each of the other communication devices or for each type of the message determining an abnormal-communication state in a case in which authentication has failed at least once and less than a specific number of times from among plural authentications performed for a corresponding respective plural of the messages and not determining the abnormal-communication state in a case in which authentication has failed the specific number of times or greater from among the plural authentications performed for the corresponding respective plural messages.

The program recorded on the non-transitory recording medium of the eighth aspect causes the following processing to be executed by the computer. The computer receives from each of the other communication devices the message appended with authentication information generated by the other communication device. For each of the received messages the computer authenticates the message based on the authentication information appended to the message.

Then, for each of the other communication devices or for each type of the message, the computer determines that there is the abnormal-communication state in a case in which authentication has failed at least once and less than a specific number of times from among plural authentications performed for a corresponding respective plural of the messages, and determines that there is not the abnormal-communication state in a case in which authentication has failed the specific number of times or greater from among the plural authentications performed for the corresponding respective plural messages.

The program is thereby able to suppress mistaken determination of an abnormal-communication state even in a case in which authentication fails for some the data received from the plural communication devices.

The present disclosure is thereby able to suppress mistaken determination of an abnormal-communication state even in a case in which authentication fails for some data received from plural communication devices.

BRIEF DESCRIPTION OF THE DRAWINGS

Exemplary embodiments of the present disclosure will be described in detail based on the following figures, wherein.

DETAILED DESCRIPTION

Communication System

Figure 1:
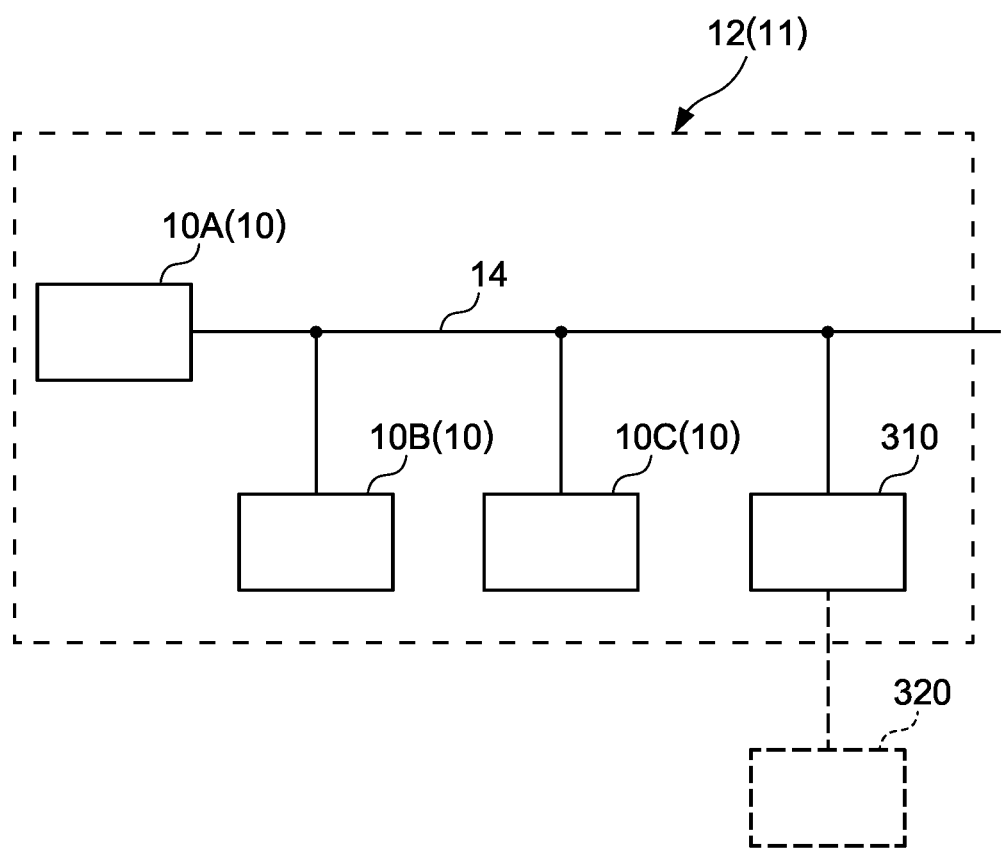
FIG. 1 is a diagram illustrating a schematic configuration of a vehicle communication system related to an exemplary embodiment.

FIG. 1 is a block diagram illustrating a schematic configuration of a vehicle communication system 12 related to an exemplary embodiment. As illustrated in FIG. 1, the vehicle communication system 12 according to the present exemplary embodiment is configured including plural electronic control units (ECUs) 10 that are communication devices, and a bus 14 that is a communication path for connecting together each of the plural ECUs 10. The vehicle communication system 12 of the present exemplary embodiment is formed as a network for connecting together each of the ECUs 10 provided to a vehicle 11, for example.

There are three ECUs 10 illustrated in FIG. 1: ECU 10A, ECU 10B, and ECU 10C. The ECU 10A, the ECU 10B, and the ECU 10C correspond to slave ECUs, and a non-illustrated ECU 10 corresponds to a master ECU. In the following explanation the ECU 10A and the ECU 10B serve as ECUs 10 on the transmission side for transmitting communication frames, and the ECU 10C serves as an ECU 10 on the reception side for receiving communication frames. Note that there is no limitation having the ECUs 10A, 10B, and 10C connected to the bus 14, and more ECUs 10 may be connected thereto. Moreover, although in the vehicle communication system 12 of the present exemplary embodiment a bus shaped bus structure is employed, there is no limitation thereto, and a star shape, ring shape, or a line shaped (daisy chain connected) bus structure may be adopted.

In the vehicle communication system 12 of the present exemplary embodiment either a controller area network (CAN) protocol is adopted as a communication format for performing communication between the ECUs 10, or a CAN with flexible data rate (CAN-FD) protocol that has a faster communication speed that a CAN protocol is adopted therefor. Note that there is no limitation to these communication formats, and a LAN standard such as Ethernet (registered trademark) may be adopted.

ECU

Figure 2:
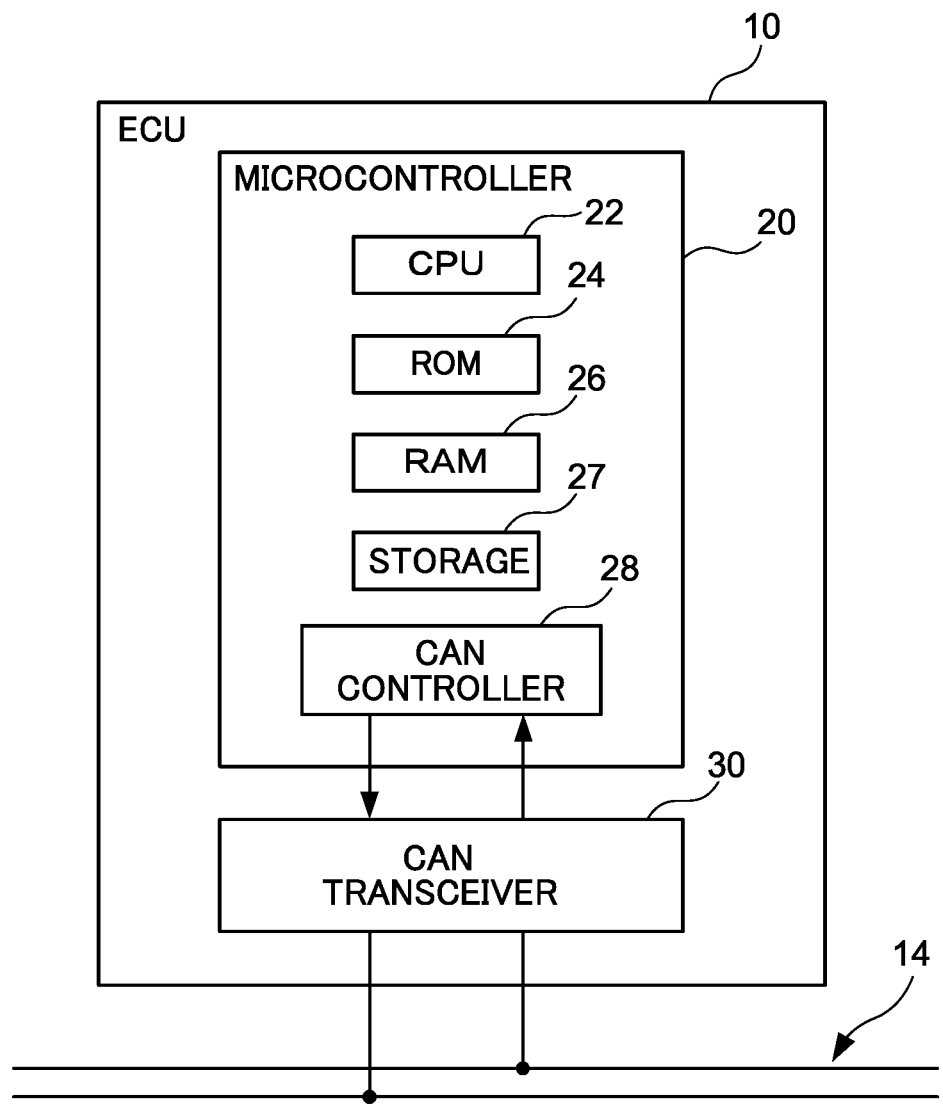
FIG. 2 is a block diagram illustrating a hardware configuration of an ECU of an exemplary embodiment.

As illustrated in FIG. 2, the ECUs 10 of the present exemplary embodiment are each configured including a microcontroller 20 and a CAN transceiver 30. The microcontroller 20 is configured including a central processing unit (CPU) 22, read only memory (ROM) 24, random access memory (RAM) 26, storage 27, and a CAN controller 28. The CPU 22 is an example of a processor, and the storage 27 is an example of memory.

The CPU 22 is a central processing unit that executes various programs and controls each section. Namely, the CPU 22 reads a program from the ROM 24, and executes the program using the RAM 26 workspace. In the present exemplary embodiment, an execution program 100 is stored on the storage 27 (see FIG. 3).

The ROM 24 is stored with various programs and various data.

The RAM 26 is employed as workspace to temporarily store programs and data.

Figure 3:
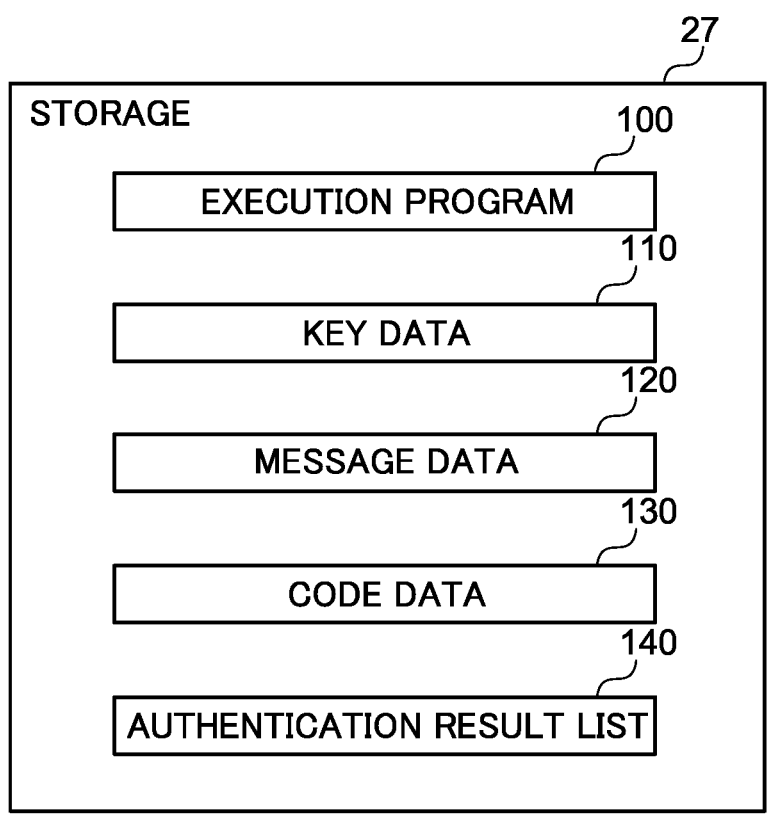
FIG. 3 is a block diagram illustrating an example of a configuration of storage of an exemplary embodiment.

The storage 27 is stored with various programs and various data. As illustrated in FIG. 3 the storage 27 is stored with an execution program 100, key data 110, message data 120, code data 130, and an authentication result list 140. Data of an encryption key 52 (see FIG. 5) for generating a message authentication code (MAC) is stored in key data 110. A message 62 (see FIG. 5) for the ECUs 10 to transmit or received thereby is stored in the message data 120. A diagnostic trouble code (DTC) to indicate a device malfunction and a record of behavior (Rob) code to indicate a communication abnormality are also stored in the code data 130. Note that device malfunctions may be stored in a different format to a DTC, and communication abnormalities may be stored in code of another format different to a Rob code. Authentication results of authenticated messages are stored by message ID in the authentication result list 140.

The CAN controller 28 implements functions related to a CAN protocol and a CAN-FD protocol, for example functions such as communication arbitration and error checking.

The CAN transceiver 30 is connected to the microcontroller 20 and the bus 14, transmits communication fames input from the microcontroller 20 to the bus 14, and includes a function to input the microcontroller 20 with communication frames forwarded by the bus 14.

Figure 4:
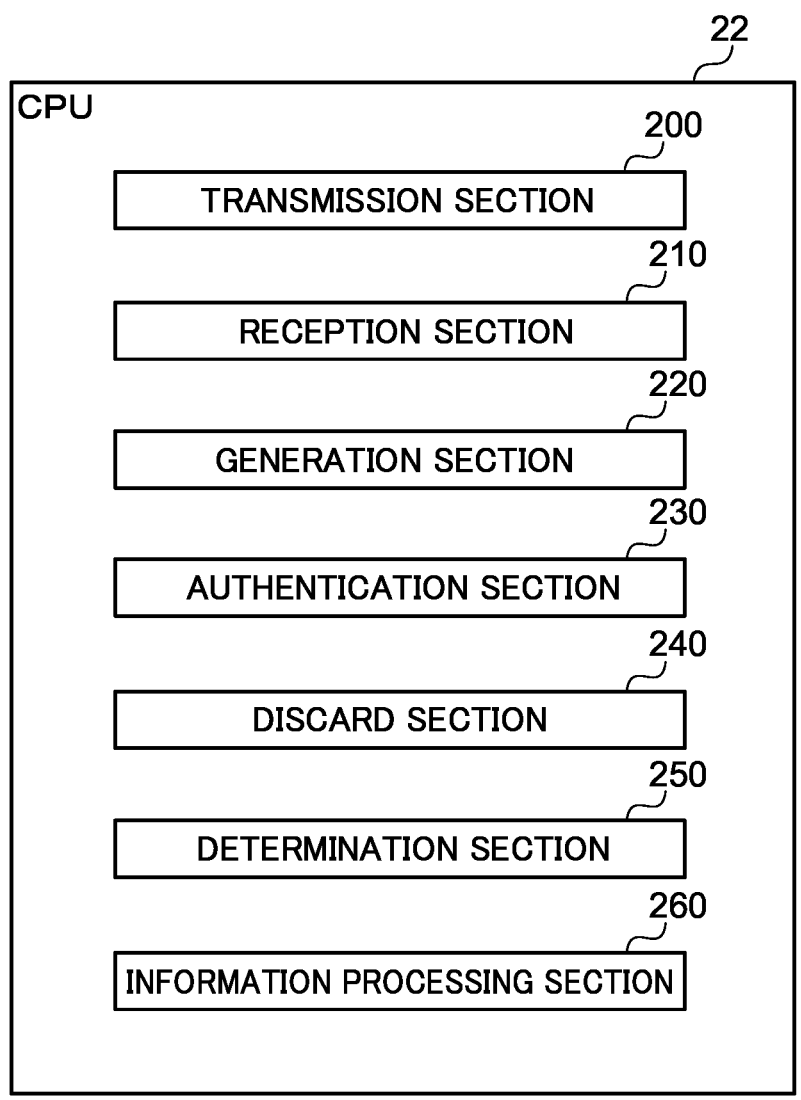
FIG. 4 is a block diagram illustrating an example of a functional configuration of a CPU of an exemplary embodiment.

FIG. 4 is a block diagram illustrating an example of a functional configuration of the ECUs 10. As illustrated in FIG. 4, each of the ECUs 10 includes a transmission section 200, a reception section 210, a generation section 220, an authentication section 230, a discard section 240, a determination section 250, and an information processing section 260. Each of these functional configurations is implemented by the CPU 22 reading and executing an execution program 100 stored in the ROM 24.

The transmission section 200 includes a function to transmit communication frames toward another ECU 10.

Figure 5:
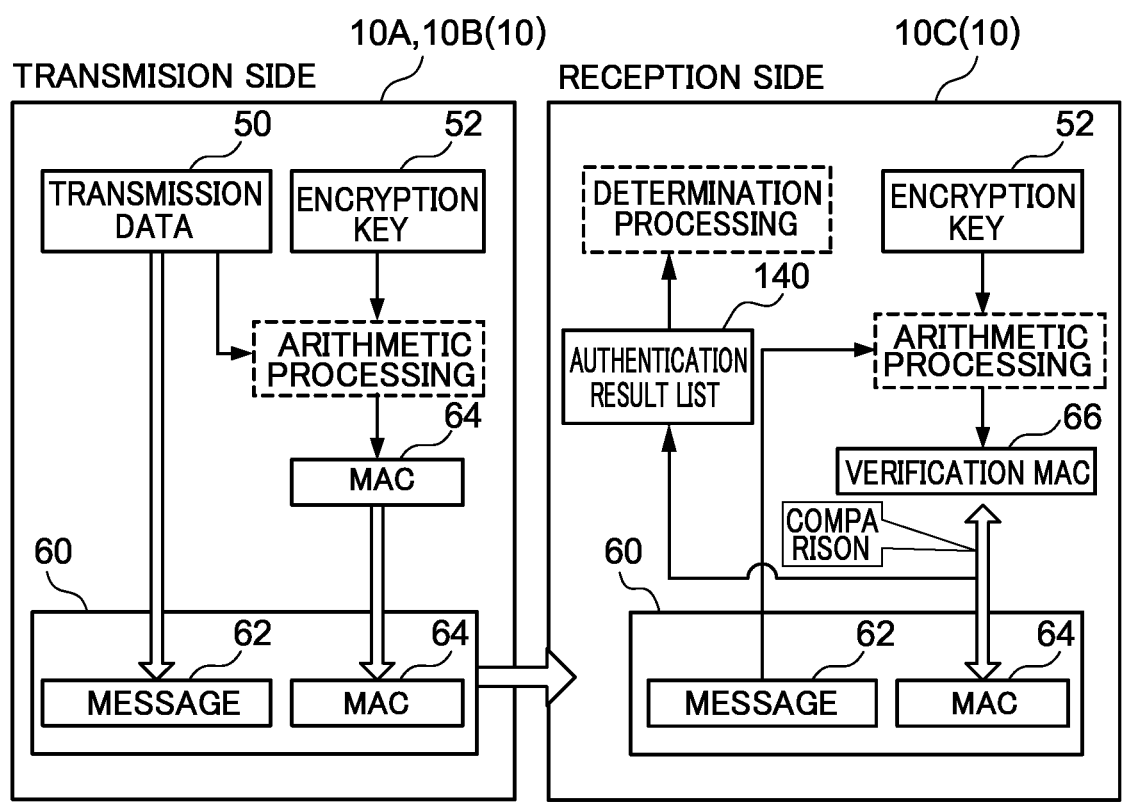
FIG. 5 is an explanatory diagram for flows of data in transmission-side and reception-side ECUs.

The reception section 210 includes a function to receive communication frames from another ECU 10. The transmission section 200 and the reception section 210 of the present exemplary embodiment are controlled according to a communication format such as a CAN protocol or a CAN-FD protocol. Communication frames accordingly include communication data 60. As illustrated in FIG. 5, the communication data 60 includes a message 62 and a message authentication code (MAC) 64 generated from the message 62. The message 62 includes a CAN ID serving as a message ID to indicate the type of the message 62.

The generation section 220 includes a function to use the encryption key 52 to generate the MAC 64 from specific data. The generation section 220 in a transmission-side ECU 10 executes arithmetic processing to generate the MAC 64 based on the transmission data 50 input from the sensors and communication devices installed to the vehicle 11 and from the encryption key 52. The generation section 220 in a reception-side ECU 10 executes arithmetic processing to generate a verification MAC 66 based on the message 62 received from the transmission-side ECU 10 and the encryption key 52. The encryption key 52 of the present exemplary embodiment is a common key employed both on the transmission side and the reception side.

The authentication section 230 includes a function to authenticate the message 62 for each of the messages 62 received by the reception section 210. The authentication section 230 compares the MAC 64 included in the received communication data 60 against the verification MAC 66 generated from the received message 62 and authenticates the message 62 when there is a match therebetween.

Figure 6:
FIG. 6 is a diagram illustrating an example of an authentication result list.

The authentication section 230 stores the authentication result list 140 with an authentication result for each of the messages 62 received by the reception section 210. For example, as illustrated in FIG. 6, respective combinations of CAN ID and authentication result are stored in the authentication result list 140.

The discard section 240 discards messages 62 which failed authentication by the authentication section 230. For example, the discard section 240 erases authentication-failed messages 62 from the RAM 26 or the storage 27.

The determination section 250 includes a function to determine for each type of message 62 which state exists out of a normal state, an abnormal-communication state, or an abnormal-key state, based on the authentication results of authentications performed by the authentication section 230 for the corresponding respective plural messages.

The normal state is a state indicating that there are no abnormalities in the ECU 10 and that communication is normal for the ECU 10. The abnormal-communication state is a state indicating that there are no abnormalities in the ECU 10 but the ECU 10 is being subjected to a security attack such as by hacking, or is information indicating that there is a malfunction in the communication function of the ECU 10. Note that a malfunction in the communication function may include a temporary communication failure. The abnormal-key state is a state indicating that there is an abnormality in the encryption key 52 of the message 62 transmission-side ECU 10.

More specifically, for each CAN ID and based on the authentication results of authentication performed by the authentication section 230 for each of the plural messages 62 with the respective CAN ID, the determination section 250 determines the abnormal-communication state in cases in which some authentication has failed out of the plural authentications, and instead of determining the abnormal-communication state determines the abnormal-key state of the ECU 10 that originated the transmission of the message 62 having that CAN ID in cases in which authentication failed for all of the plural authentications.

More specifically, for each CAN ID and based on a first specific number of authentication results for the messages 62 having the CAN ID after starting the vehicle 11, the determination section 250 determines the normal state in cases in which all authentications succeeded, determines the abnormal-communication state in cases in which authentication succeeded a second specific number of times or greater from among the first specific number of authentications but failed for some authentications, and instead of determining the abnormal-communication state determines the abnormal-key state for the ECU 10 that originated the transmission of the message 62 having that CAN ID in cases in which authentication failed for all corresponding authentications.

The "first specific number" in the present exemplary embodiment is a number of times equivalent to a time required to get a device related to authentication (e.g. the generation section 220 and the authentication section 230) ready from starting up of the ECU 10. Moreover, a definition of the "second specific number" is as follows. The second specific number is set to a number of times such that a probability of the message 62 being authenticated for the second specific number of times due to chance matches between the MAC 64 and the verification MAC 66 is less than a failure rate of Level D ASIL (automotive safety integrity level).

Note that the determination section 250 may be configured so as to instead of determining the abnormal-communication state determine the abnormal-key state of the ECU 10 that originated the transmission of the messages 62 having a given CAN ID even when not all authentications have failed by such determination in cases in which authentication has succeeded less than the second specific number of times.

Moreover, in cases in which a communication disruption has been detected by the information processing section 260, as described below, the determination section 250 determines which state exists out of the normal state, the abnormal-communication state, and the abnormal-key state for the type of the message 62 corresponding to the detected communication disruption based on plural authentication results of authentication performed by the authentication section 230.

More specifically, based on the authentication results of authentication performed by the authentication section 230 for each of plural messages 62 having the same CAN ID to the message 62 for which communication disruption was detected, the abnormal-communication state is determined in cases in which some authentications failed out of the plural authentications, and instead of determining the abnormal-communication state the abnormal-key state is determined for the ECU 10 that originated the transmission of the message 62 having the given CAN ID in cases in which authentication failed for all of the plural authentications.

More specifically, in cases in which communication disruption has been detected by the information processing section 260, the determination section 250 determines the normal state in cases in which all authentications succeeded based on the first specific number of authentication results for the messages 62 having the same CAN ID as the message 62 for which communication disruption was detected, determines the abnormal-communication state in cases in which the second specific number of authentications or greater succeeded from among the first specific number of authentications but some authentications failed therein, and instead of determining the abnormal-communication state determines the abnormal-key state for the ECU 10 that originated the transmission of the message 62 having the given CAN ID in cases in which all authentications have failed therein.

The information processing section 260 includes a function to process the messages 62 acquired from other ECUs 10 and sensors of each section. For example, in cases in which the ECU 10 is a meter ECU to display information about the vehicle 11, the information processing section 260 has capabilities to display information on a meter panel based on the received message 62. Moreover, the information processing section 260 executes failsafe processing for an abnormal-key state in cases in which the abnormal-key state has been determined by the determination section 250. For example, when the ECU 10 is a meter ECU for displaying the vehicle 11 information, the information processing section 260 is able to display predetermined information on the meter panel in cases in which the message 62 with the CAN ID when the abnormal-key state was determined indicates the information to be displayed on the meter panel.

Moreover, the information processing section 260 detects communication disruption of the messages 62 based on a reception condition of the messages 62. For example, the information processing section 260 detects as a communication disruption of the messages 62 plural messages 62 having the same CAN ID for which authentication by the authentication section 230 failed being discarded by the discard section 240.

Operation

Explanation next follows regarding a flow of processing executed by each of the ECUs 10 in the present exemplary embodiment in a case in which communication data 60 is transmitted from the ECU 10A and the ECU 10B toward the ECU 10C, with reference to the flowcharts in FIG. 7 to FIG. 11. Note that similar processing may be executed in cases in which the communication data 60 is transmitted from the ECU 10B and the ECU 10C toward the ECU 10A, and in cases in which the communication data 60 is transmitted from the ECU 10C and ECU 10A toward the ECU 10B.

Processing according to the following steps is executed by the CPU 22 in the transmission-side ECU 10A and ECU 10B.

Figure 7:
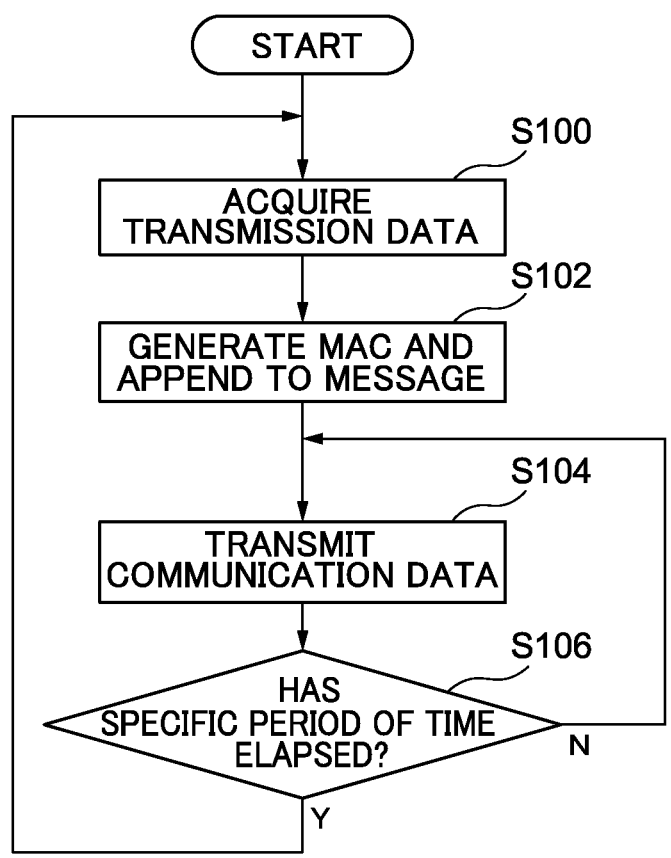
FIG. 7 is a flowchart illustrating a flow of processing in a transmission-side ECU.

At step S100 of FIG. 7 the CPU 22 acquires the transmission data 50. The acquired transmission data 50 is included in the communication data 60 and is configured by the message 62 including the CAN ID (see FIG. 5).

At step S102 the CPU 22 generates the MAC 64 and also appends the MAC 64 to the message 62. Namely, the CPU 22 generates the MAC 64 by performing arithmetic processing based on the transmission data 50 and the encryption key 52, and appends the generated MAC 64 as low-order bits of the message 62 (see FIG. 5).

At step S104 the CPU 22 transmits the communication data 60 including the message 62 and the MAC 64 to the reception-side ECU 10.

At step S106 the CPU 22 determines whether or not a specific period of time has elapsed. In the vehicle communication system 12 of the present exemplary embodiment the same communication data 60 is transmitted for the specific period of time so as to prevent non-receipt of communication data 60 in the reception-side ECU 10. The CPU 22 returns to step S100 when determined that the specific period of time has elapsed. However, the CPU 22 returns to step S104 when determined that the specific period of time has not elapsed. Namely, processing is repeatedly executed to transmit the existing communication data 60 until the specific period of time elapses, and to transmit new communication data 60 when the specific period of time has elapsed.

Abnormality-determination processing is then executed by the CPU 22 in the reception-side ECU 10. The abnormality-determination processing illustrated in FIG. 8 is executed for each of the CAN IDs that are the message IDs.

Figure 8:
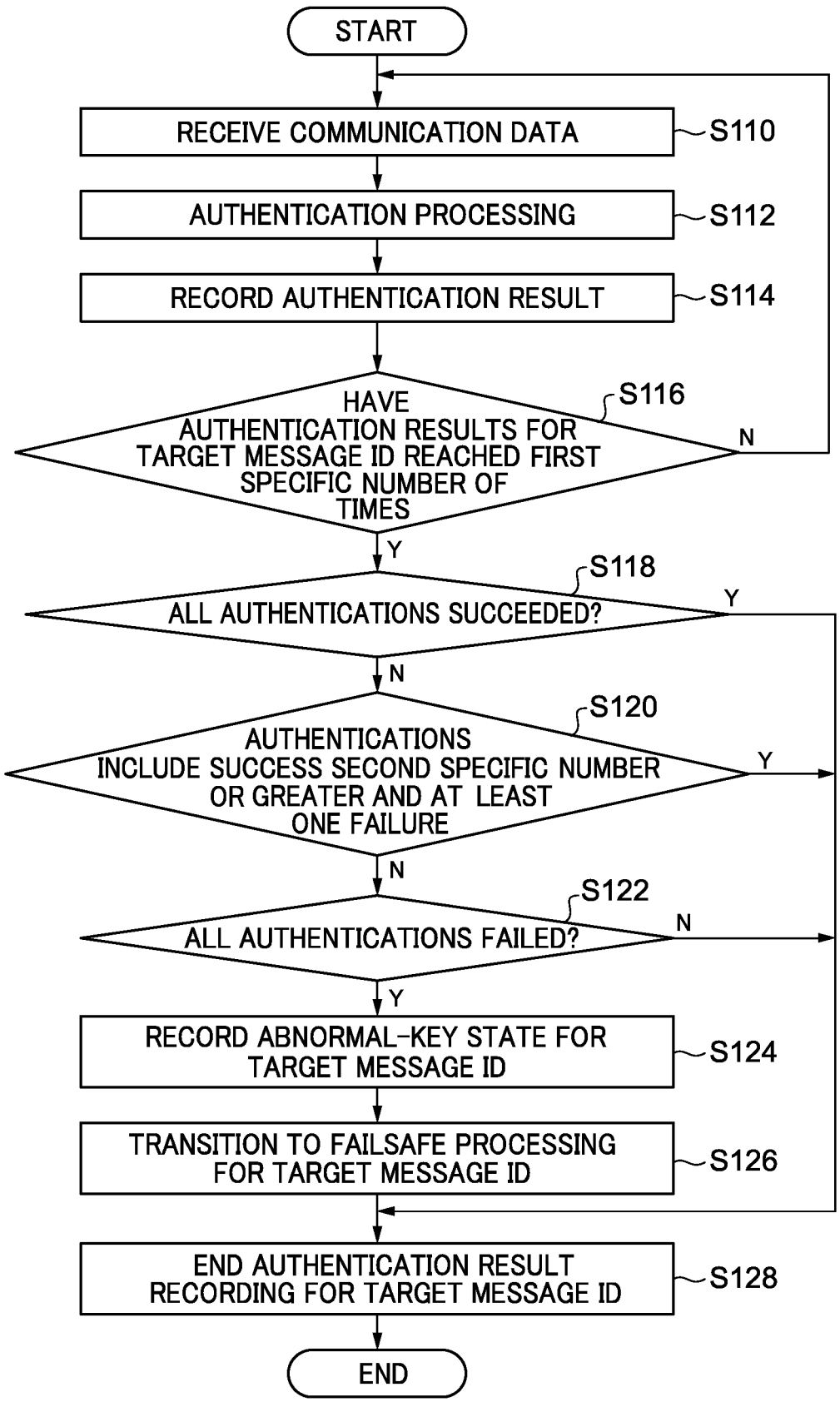
FIG. 8 is a flowchart illustrating a flow of abnormality-determination processing in a reception-side ECU.

At step S110 of FIG. 8 the CPU 22 receives the communication data 60 including the message 62 having the target CAN ID from the transmission-side ECU 10.

At step S112 the CPU 22 executes authentication processing. Namely, the CPU 22 generates the verification MAC 66 by performing arithmetic processing based on the message 62 and the encryption key 52, and compares this verification MAC 66 to the MAC 64 included in the communication data 60 (see FIG. 5).

At step S114 the CPU 22 records the authentication result of step S112 in the authentication result list 140 together with the CAN ID.

At step S116 the CPU 22 determines whether or not the authentication processing has been performed the first specific number of times from when the ECU 10 started up for the messages 62 having the target CAN ID. The CPU 22 proceeds to step S118 in cases in which determination is that the authentication processing has been performed the first specific number of times from when the ECU 10 started up for the messages 62 having the target CAN ID. However, the CPU 22 returns to step S110 in cases in which determination is that the authentication processing has been performed less than the first specific number of times from when the ECU 10 started up for the messages 62 having the target CAN ID. Namely, in the authentication processing for the messages 62 having the target CAN ID the CPU 22 repeatedly receives the communication data 60 until received the first specific number of times or greater from when the ECU 10 started up. The received communication data 60 is temporarily stored in the RAM 26 or the storage 27.

This is followed by steps S118 to S122 in which state determination is performed based on the comparison results between the MAC 64 and the verification MAC 66.

At step S118 the CPU 22 performs determination as to whether or not authentication has succeeded every time for the messages 62 having the target CAN ID. Namely, the CPU 22 performs determination as to whether or not the MAC 64 and the verification MAC 66 match every time in the results of plural instances of authentication processing on the messages 62 having the target CAN ID. The CPU 22 proceeds to step S128 when determined authentication succeeded every time. In such cases the communication of the messages 62 having the target CAN ID is determined to be in the normal state. However, the CPU 22 proceeds to step S120 when determined authentication had not succeeded at least one time.

At step S120 the CPU 22 performs determination as to whether or not the authentication of the messages 62 having the target CAN ID included success the second specific number of times or greater and a failure. Namely, the CPU 22 determines whether or not the results of plural times of authentication processing for the messages 62 having the target CAN ID included the second specific number of times or greater of instances in which the MAC 64 and the verification MAC 66 matched and included an instance in which the MAC 64 and the verification MAC 66 did not match. The CPU 22 proceeds to step S128 in cases in which determination is that the authentication for the messages 62 having the target CAN ID included success the second specific number of times or greater and included a failure. The abnormal-communication state is determined for communication of the messages 62 having the target CAN ID in such cases. However, the CPU 22 proceeds to step S122 when determined the authentications for the messages 62 having the target CAN ID did not include both success the second specific number of times or greater and a failure, namely when determined that the authentication success is less than the second specific number of times.

At step S122 the CPU 22 determines whether or not all of the authentications failed for the messages 62 having the target CAN ID. Namely, the CPU 22 determines whether or not the result was that the MAC 64 and the verification MAC 66 did not match every time for the plural times of authentication processing for the messages 62 having the target CAN ID. The CPU 22 proceeds to step S124 when determined that the authentication failed every time for the messages 62 having the target CAN ID. However, the CPU 22 proceeds to step S128 when determined that authentication did not fail at least one time.

Note that step S122 may be omitted. In such cases the CPU 22 proceeds to step S124 when determined that the authentication success at step S120 was less than the second specific number of times.

At step S124 the CPU 22 records the abnormal-key state for the messages 62 having the target CAN ID in the RAM 26.

At step S126 the CPU 22 transitions to failsafe processing for the abnormal-key state for the messages 62 having the target CAN ID.

At step S128 the CPU 22 ends recording of authentication results for the messages 62 having the target CAN ID and ends the abnormality-determination processing.

Figure 9:
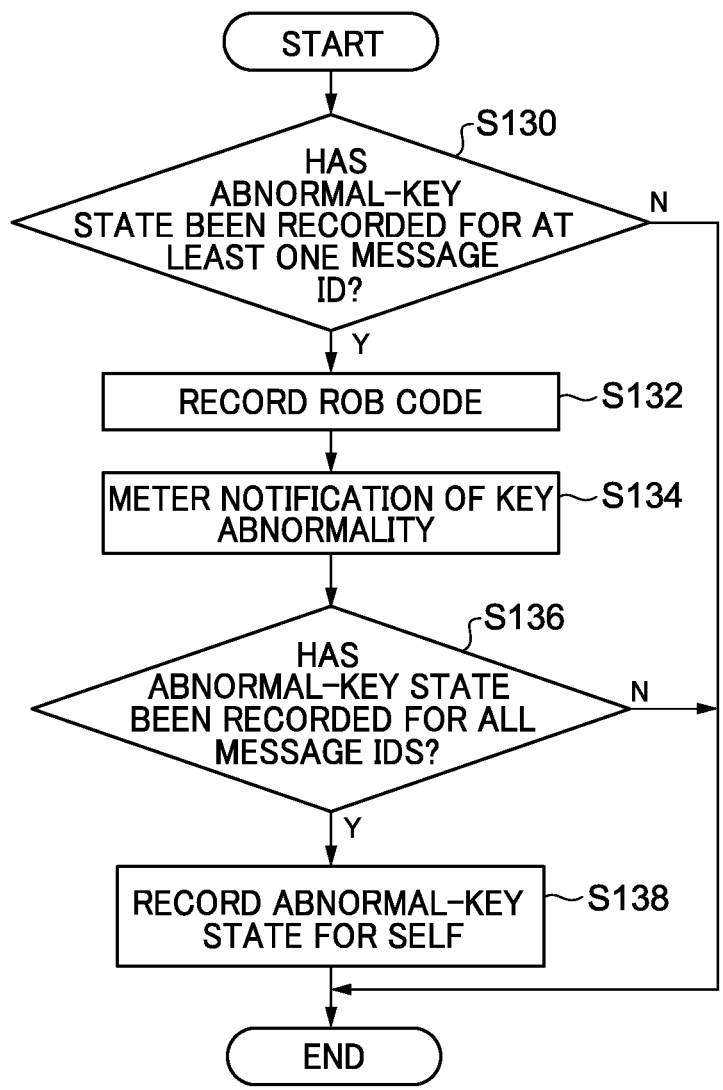
FIG. 9 is a flowchart illustrating a flow of abnormality-recording processing in a reception-side ECU.

When the abnormality-determination processing has been executed for all of the CAN IDs the abnormality-recording processing illustrated in FIG. 9 is then executed by the CPU 22 in the reception-side ECU 10C.

At step S130 the CPU 22 determines whether or not the abnormal-key state has been recorded for at least one of the CAN IDs. Processing proceeds to step S132 in cases in which the results of the abnormality-determination processing are that the abnormal-key state has been recorded for at least one of the CAN IDs. However, the abnormality-recording processing is ended in cases in which the abnormal-key state has not been recorded therein.

At step S132 the CPU 22 saves a Rob code. Namely, the CPU 22 stores a code indicating that there was an abnormality in communication.

At step S134 the CPU 22 displays a message indicating the abnormal-key state on the meter panel.

At step S136 the CPU 22 determines whether or not the abnormal-key state has been recorded for all of the CAN IDs. Processing proceeds to step S138 in cases in which the results of abnormality-determination processing are that the abnormal-key state has been recorded for all of the CAN IDs. However, the abnormality-recording processing is ended in cases in which the abnormal-key state has not been recorded for at least one of the CAN IDs.

At step S138 the ECU 10C records an abnormal-key state for itself in the storage 27 and then ends abnormality-recording processing.

Moreover, in cases in which communication disruption has been detected the abnormality-determination processing illustrated in FIG. 8 is executed for all the messages 62 having the same CAN ID as that of the message 62 for which communication disruption has been detected. Moreover, the abnormality-recording processing illustrated in FIG. 9 is executed periodically.

Figure 10:
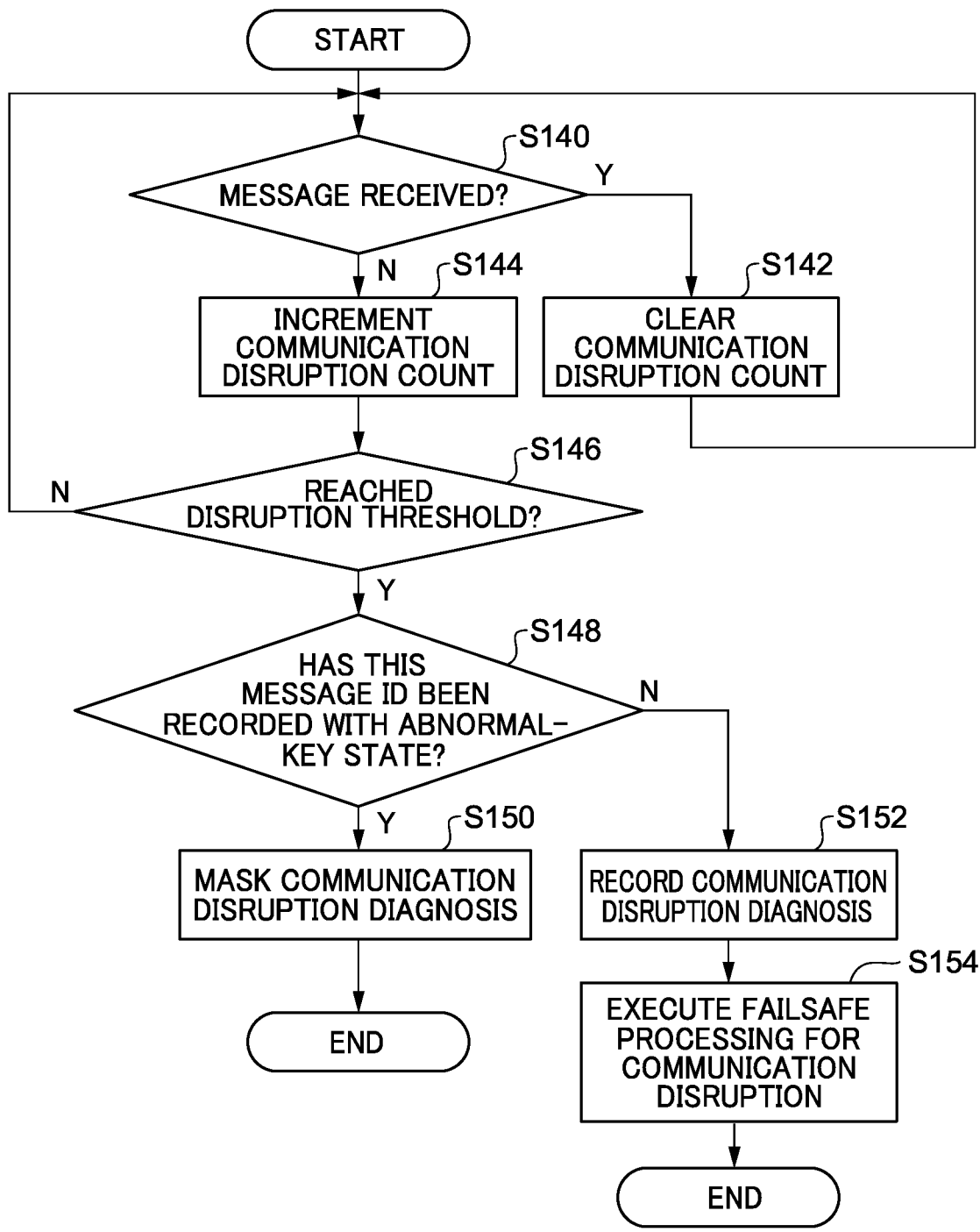
FIG. 10 is a flowchart illustrating a flow of communication-disruption-recording processing in a reception-side ECU.

Moreover, the communication-disruption-recording processing illustrated in FIG. 10 is executed by the CPU 22 in the reception-side ECU 10C. The communication-disruption-recording processing is executed for each of the CAN IDs that are message IDs.

At step S140 the CPU 22 determines whether or not the communication data 60 including a message 62 having the target CAN ID has been received. Processing proceeds to step S142 in cases in which the communication data 60 including a message 62 having the target CAN ID has been received. However, processing proceeds to step S144 in cases in which communication data 60 including a message 62 having the target CAN ID has not been received.

At step S142 the CPU 22 clears to zero a value of a communication disruption count for recording communication disruptions and returns to step S140.

At step S144 the CPU 22 increments the count value of the communication disruption count and then proceeds to step S146.

At step S146 the CPU 22 determines whether or not the communication disruption count value has reached a disruption threshold for detecting communication disruption. Processing returns to step S140 in cases in which the communication disruption count value has not reached the disruption threshold. However, processing proceeds to step S148 in cases in which the communication disruption count value has reached the disruption threshold.

At step S148 the CPU 22 determines whether or not the abnormal-key state has been recorded in the RAM 26 for the messages 62 having the target CAN ID. Processing proceeds to step S150 in cases in which the abnormal-key state has been recorded by the above abnormality-determination processing in the RAM 26 for the messages 62 having the target CAN ID. However, processing proceeds to step S152 in cases in which the abnormal-key state has not been recorded in the RAM 26 for the messages 62 having the target CAN ID.

At step S150 the CPU 22 masks so as to prevent recording of a communication disruption diagnosis and then ends the communication-disruption-recording processing.

At step S152 the CPU 22 records a communication disruption diagnosis in the storage 27. At step S154 the CPU 22 executes the failsafe processing for communication disruption for the messages 62 having the target CAN ID and then ends the communication-disruption-recording processing.

Figure 11:
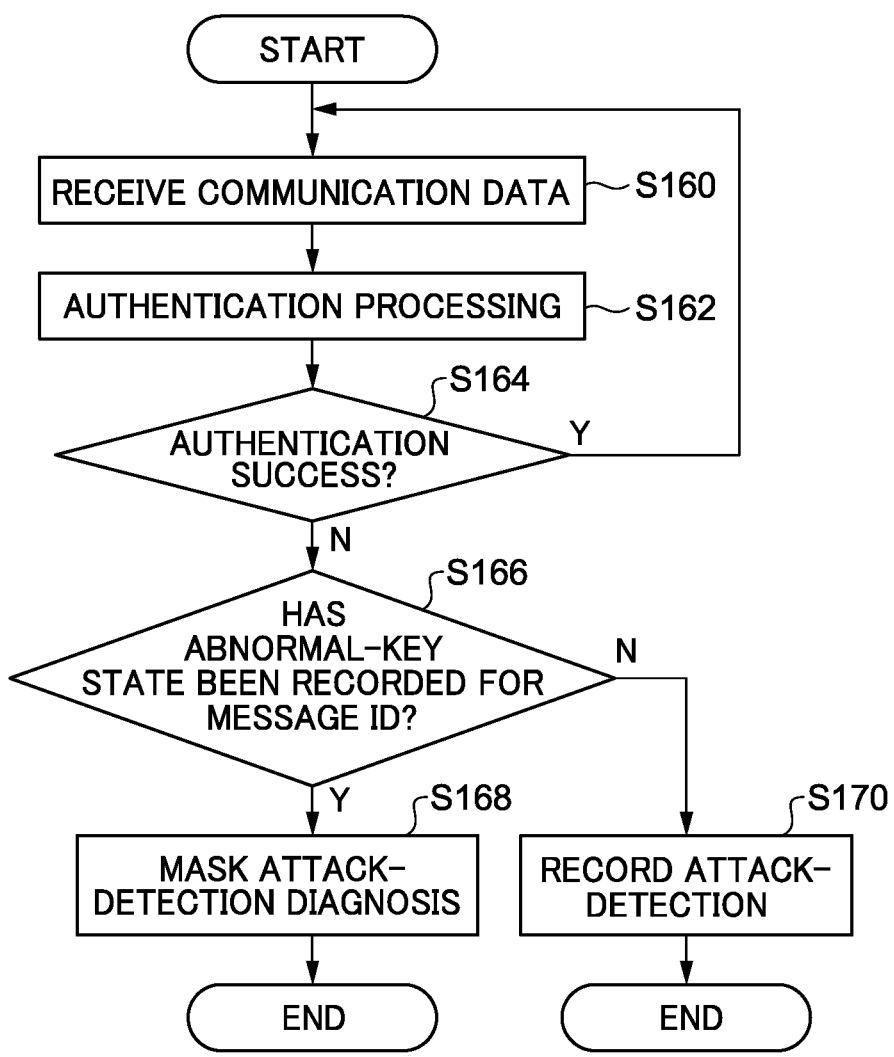
FIG. 11 is a flowchart illustrating a flow of attack-detection-recording processing in a reception-side ECU.

Moreover, the attack-detection-recording processing illustrated in FIG. 11 is executed by the CPU 22 in the reception-side ECU 10C. The attack-detection-recording processing is executed for each of the CAN IDs that are message IDs.

At step S160 the CPU 22 receives the communication data 60 including the message 62 having the target CAN ID, similarly to at step S110.

At step S162 the CPU 22 executes authentication processing similarly to at step S112.

At step S164 the CPU 22 performs determination as to whether or not authentication by the authentication processing of step S162 has succeeded. Processing returns to step S160 in cases in which the authentication by the authentication processing of step S162 has succeeded. However, processing proceeds to step S166 in cases in which authentication by the authentication processing of step S162 has failed.

At step S166 the CPU 22 determines whether or not the abnormal-key state has been recorded in the RAM 26 for the message 62 having the target CAN ID. In the abnormality-determination processing the processing proceeds to step S168 in cases in which the abnormal-key state has been recorded in the RAM 26 for the message 62 having the target CAN ID. However, processing proceeds to step S170 in cases in which the abnormal-key state has not been recorded in the RAM 26 for the message 62 having the target CAN ID.

At step S168 the CPU 22 masks so as to prevent recording of attack-detection and then ends the attack-detection-recording processing.

At step S170 the CPU 22 records an attack-detection in the storage 27 and then ends the attack-detection-recording processing.

Figure 12:
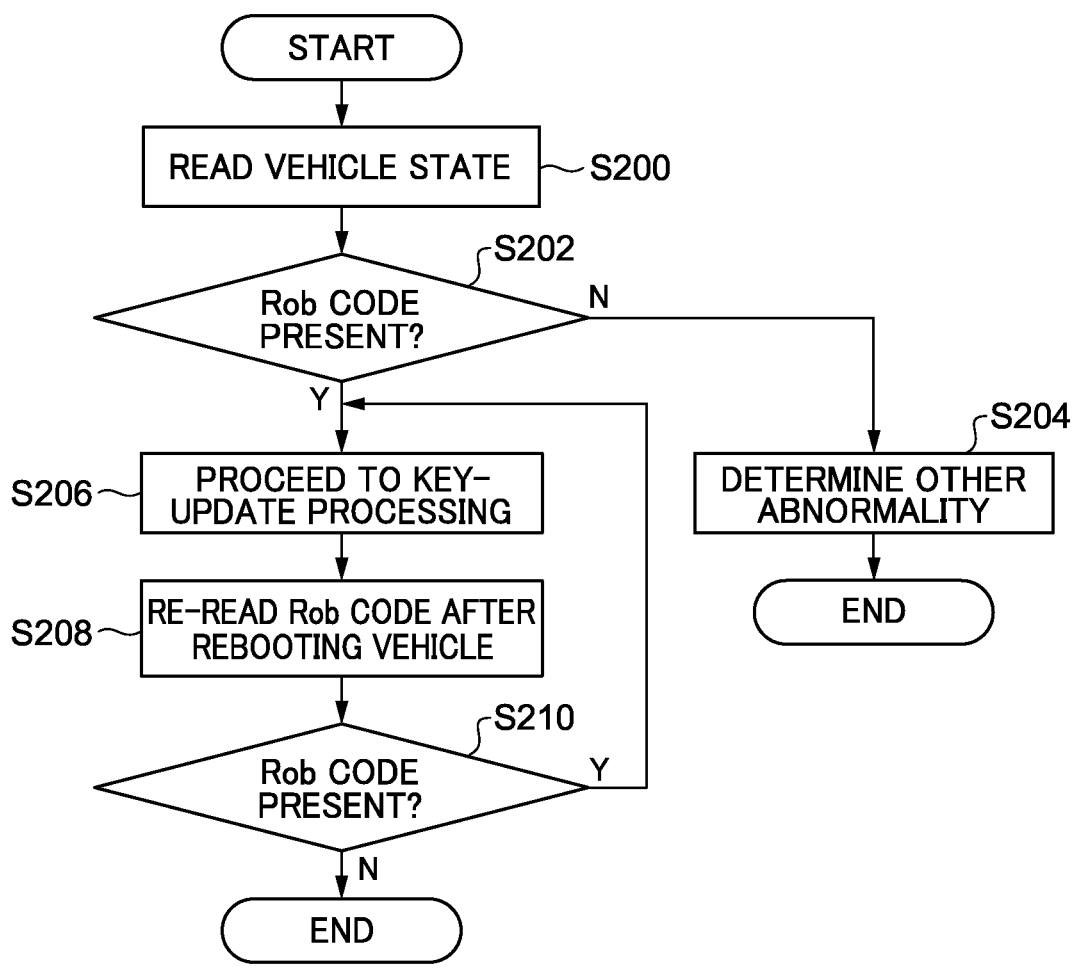
FIG. 12 is a flowchart illustrating a flow of diagnostic processing in a diagnostic device.

Moreover, during work at a dealer an operator connects a dealer diagnostic device 320 to the vehicle communication system 12 via a diagnostic interface section 310 of the vehicle 11, as illustrated in FIG. 1, when the operator checks abnormal state display on the meter panel of the vehicle 11. The dealer diagnostic device 320 then executes the diagnostic processing illustrated in FIG. 12.

At step S200 the dealer diagnostic device 320 reads information indicating the vehicle state including a Rob code from the storage 27 of each of the ECUs 10 of the vehicle 11.

At step S202 the dealer diagnostic device 320 determines whether or not there is a Rob code included in the information read at step S200. Processing proceeds to step S206 in cases in which there is a Rob code included in the information read at step S200. However, processing proceeds to step S204 in cases in which there is no Rob code included in the information read at step S200.

At step S204 the dealer diagnostic device 320 determines there to be another abnormality different to the abnormal-key state and then ends the diagnostic processing.

At step S206 the dealer diagnostic device 320 performs key-update processing for each of the ECUs 10 in the vehicle communication system 12.

At step S208 the dealer diagnostic device 320 reboots the vehicle communication system 12 of the vehicle 11. When doing so the abnormality-determination processing illustrated in FIG. 8 and the abnormality-recording processing illustrated in FIG. 9 is executed for each of the ECUs 10.

Then when a given duration has elapsed since rebooting, the dealer diagnostic device 320 reads information indicating the vehicle state including a Rob code from the storage 27 of each of the ECUs 10 of the vehicle communication system 12.

At step S210 the dealer diagnostic device 320 determines whether or not a Rob code is included in the information read at step S208. Processing returns to step S206 in cases in which a Rob code is included in the information read at step S208. However, the diagnostic processing is ended in cases in which there is no Rob code included in the information read at step S208.

Summary

The ECU 10 of the vehicle communication system 12 of the present exemplary embodiment is able to treat as an abnormality in the encryption key of another ECU 10 cases in which some authentications have failed out of plural authentications performed by the authentication section 230 for plural messages corresponding to a single type of message, and to also to determine this not to be a communication abnormality such as hacking or the like. This ECU 10 is thereby able to suppress mistaken determination of an abnormal-communication state even in a case in which some authentications have failed for data received from plural ECUs 10.

Hitherto there has been technology for a slave ECU to receive, from a master ECU that holds a correct encryption key, a message including a MAC generated using this encryption key, and to perform failure-diagnosis of the device itself by performing MAC authentication.

However, there is a concern that a faulty encryption key of the counterparty might remain undetected in cases in which there is communication between slave ECUs, and that this might be mistakenly diagnosed as a malfunction of the device itself and recorded as an abnormality.

In the vehicle communication system 12 of the present exemplary embodiment, an abnormal-communication state is recorded when some MAC authentications have failed from among plural MAC authentications performed for respective plural messages, and instead of recording an abnormal-communication state an abnormal-key state is determined for the encryption key of another ECU in cases in which all of the plural MAC authentications have failed. Thus this enables the avoidance of an abnormal-communication state being recorded when all of plural MAC authentications have failed in cases in which there is a faulty encryption key of the other ECU. For example, this enables the avoidance of an abnormal-communication state being recorded even in cases in which updating of encryption keys have been overlooked for some ECUs.

Moreover, a security function prevents an illicit attack when such an attack has occurred and records that there was an attack. However, a security function might unintentionally mistakenly detect as an attack a situation in which an ECU is not in a normal state. However, the present exemplary embodiment suppresses mistaken detection by a security function when an ECU is not in a normal state.

Remarks

Note that although in the present exemplary embodiment an example has been described in which, based on authentication results performed for each CAN ID by the authentication section 230 for each of plural messages 62 including the target CAN ID, the abnormal-communication state is determined in cases in which some authentications have failed from among plural authentications, but the abnormal-communication state is not determined and instead an abnormal-key state is determined for the ECU 10 that originated the transmission of the message 62 having the CAN ID in cases in which authentication failed for all of the plural authentications, there is no limitation to such a configuration. For example, a configuration may be adopted in which, based on authentication results performed by the authentication section 230 for plural respective messages 62 received from each of the transmission originating ECUs 10, the abnormal-communication state is determined in cases in which some authentications have failed from among the plural authentications, and the abnormal-communication state not determined and instead an abnormal-key state of this ECU 10 is determined in cases in which authentication failed for all of the plural authentications. In such cases each of the ECUs may hold in advance correspondence relationships between CAN IDs and transmission originating ECUs, and then perform determination for each of the transmission originating ECUs 10 based on the authentication results performed by the authentication section 230 for each of the plural messages 62 including the CAN ID corresponding to this ECU 10.

Moreover, each type of processing executed by the CPU 22 reading software (a program) in the above exemplary embodiment may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Moreover, the abnormality-determination processing and abnormality-recording processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, an embodiment has been described in the above exemplary embodiment in which the program is pre-stored (pre-installed) on a computer readable non-transitory recording medium. For example, the execution program 100 pre-stored on the ROM 24. However, there is no limitation thereto, and the execution program 100 may be provided in a format recorded on a non-transitory recording medium such as a compact disc read only memory (CD-ROM), digital versatile disc read only memory (DVD-ROM), universal serial bus (USB) memory, or the like. Moreover, a configuration may be adopted in which the execution program 100 is downloaded from an external device over a network.

In the flow of processing described for the exemplary embodiment, redundant steps may be omitted, new steps may be added, and the processing sequence may be swapped around within a range not departing from the spirit of the present disclosure.

What is claimed is:

1. A communication device comprising:
a memory; and
a processor coupled to the memory, wherein the processor is configured to:
  receive, from each of a plurality of other communication devices, a message appended with authentication information generated by the other communication device;
  for each of the received messages, authenticate the message based on an encryption key stored in the memory and on the authentication information appended to the message;
  for each of the other communication devices or for each type of message,
    determine that there is an abnormal-communication state in a case in which authentication has failed at least once and less than a specific number of times from among a plurality of authentications performed for a corresponding respective plurality of the messages, the abnormal-communication state being a state indicating that there are no abnormalities in a processor of the other communication device but the other communication device is being subjected to a security attack or a state indicating a malfunction in a communication function of the processor of the other communication device, and
    determine that there is an abnormal state of the encryption key of the other communication device that generated the message in a case in which authentication has failed the specific number of times or greater from among the plurality of authentications performed for the corresponding respective plurality of the messages,
wherein the plurality of authentications is a number of times equivalent to a time required to get a device related to authentication ready from starting up of the processor, and
wherein the specific number of times is set such that a probability of the message being authenticated due to chance matches between a message authentication code generated from the message and a verification message authentication code based on the message is less than a failure rate of Level D ASIL (automotive safety integrity level).

2. The communication device of claim 1, wherein:
the message includes identification information to indicating a type of message; and
the processor is configured to:
  for each of the identification information,
    determine that there is the abnormal-communication state in a case in which authentication has failed at least once and less than the specific number of times from among the plurality of authentications performed for the respective plurality of the messages including the identification information, and
    determine that there is the abnormal state of the encryption key of the other communication device in a case in which authentication has failed the specific number of times or greater from among the plurality of authentications performed for a respective plurality of the messages including the identification information.

3. The communication device of claim 1, wherein:
the processor is further configured so as to:
discard a message that has failed the authentication, and
execute information processing according to the message;
the processor is configured to detect a communication disruption based on a reception condition of the message;
in a case in which the communication disruption has been detected the processor is configured to:
determine that there is the abnormal-communication state in a case in which authentication has failed for a type of message corresponding to the detected communication disruption at least once and less than the specific number of times from among the plurality of authentications performed for the corresponding respective plurality of the messages, and
determine that there is the abnormal state of the encryption key of the other communication device in a case in which authentication has failed the specific number of times or greater from among the plurality of authentications performed for the corresponding respective plurality of the messages.

4. The communication device of claim 1, wherein the processor is configured to:
determine that there is an abnormal-communication state in a case in which some authentications have failed from among the plurality of authentications performed for the corresponding respective plurality of the messages; and
determine that there is the abnormal state of the encryption key of the other communication device in a case in which authentication has failed for all of the plurality of authentications performed for the corresponding respective plurality of the messages.

5. A vehicle comprising a plurality of communication devices, each being the communication device according to claim 1.

6. The communication device of claim 1, wherein for each of the other communication devices or for each type of message, the processor is configured to
determine that there is the abnormal-communication state in a case in which authentication has failed at least once and less than the specific number of times and authentication has succeeded greater than the specific number of times from among the plurality of authentications performed for the corresponding respective plurality of the messages, and
determine that there is the abnormal state of the encryption key of the other communication device in a case in which authentication has not succeeded greater than the specific number of times and failed the specific number of times or greater from among the plurality of authentications performed for the corresponding respective plurality of the messages.

7. A communication method comprising a computer:
receiving, from each of a plurality of other communication devices, a message appended with authentication information generated by the other communication device;
for each of the received messages, authenticating the message based on an encryption key stored in a memory and on the authentication information appended to the message;
for each of the other communication devices or for each type of message,
determining that there is an abnormal-communication state in a case in which authentication has failed at least once and less than a specific number of times from among a plurality of authentications performed for a corresponding respective plurality of the messages, the abnormal-communication state being a state indicating that there are no abnormalities in a processor of the other communication device but the other communication device is being subjected to a security attack or a state indicating a malfunction in a communication function of the processor of the other communication device, and
determining that there is an abnormal state of the encryption key of the other communication device that generated the message in a case in which authentication has failed the specific number of times or greater from among the plurality of authentications performed for the corresponding respective plurality of the messages,
wherein the plurality of authentications is a number of times equivalent to a time required to get a device related to authentication ready from starting up of the computer, and
wherein the specific number of times is set such that a probability of the message being authenticated due to chance matches between a message authentication code generated from the message and a verification message authentication code based on the message is less than a failure rate of Level D ASIL (automotive safety integrity level).

8. A non-transitory recording medium storing a program that is executable by a computer to perform processing comprising:
receiving, from each of a plurality of other communication devices, a message appended with authentication information generated by the other communication device;
for each of the received messages, authenticating the message based on an encryption key stored in a memory and on the authentication information appended to the message;
for each of the other communication devices or for each type of message,
determining that there is an abnormal-communication state of the other communication device in a case in which authentication has failed at least once and less than a specific number of times from among a plurality of authentications performed for a corresponding respective plurality of the messages, the abnormal-communication state being a state indicating that there are no abnormalities in a processor of the other communication device but the other communication device is being subjected to a security attack or a state indicating a malfunction in a communication function of the processor of the other communication device, and
determining that there is an abnormal state of the encryption key of the other communication device that generated the message in a case in which authentication has failed the specific number of times or greater from among the plurality of authentications performed for the corresponding respective plurality of the messages,
wherein the plurality of authentications is a number of times equivalent to a time required to get a device related to authentication ready from starting up of the computer, and wherein the specific number of times is set such that a probability of the message being authenticated due to chance matches between a message authentication code generated from the message and a verification message authentication code based on the message is less than a failure rate of Level D ASIL (automotive safety integrity level).

\* \* \* \* \*